Oct. 16, 1934.  F. O. ALBERTSON  1,977,224
HANDLE AND CABLE HOUSING FOR ELECTRIC DEVICES
Filed Nov. 30, 1932   2 Sheets-Sheet 1
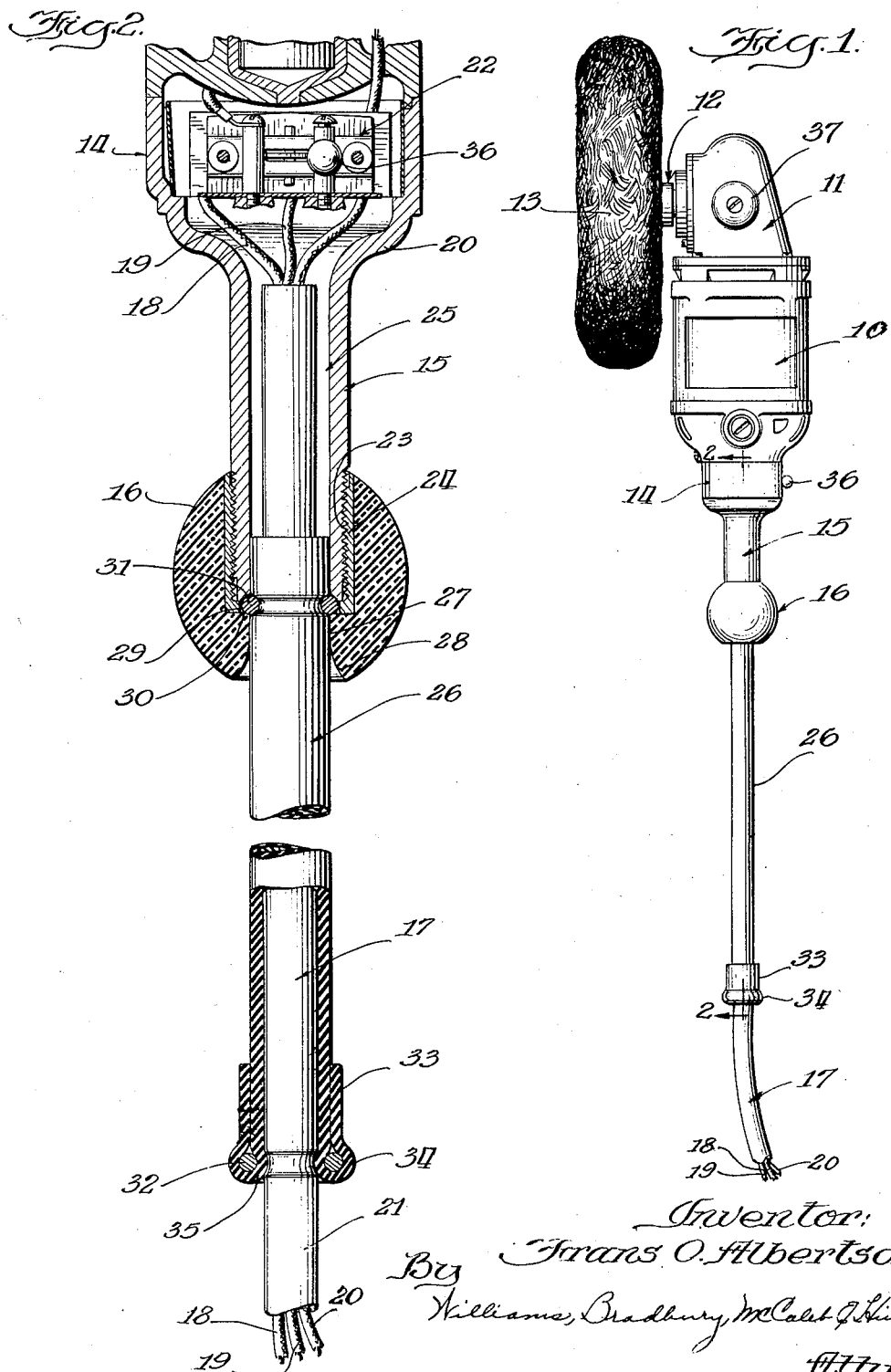
Inventor:
Frans O. Albertson
By Williams, Bradbury, McCaleb & Hinkle
Attys.

Oct. 16, 1934.    F. O. ALBERTSON    1,977,224
HANDLE AND CABLE HOUSING FOR ELECTRIC DEVICES
Filed Nov. 30, 1932    2 Sheets-Sheet 2
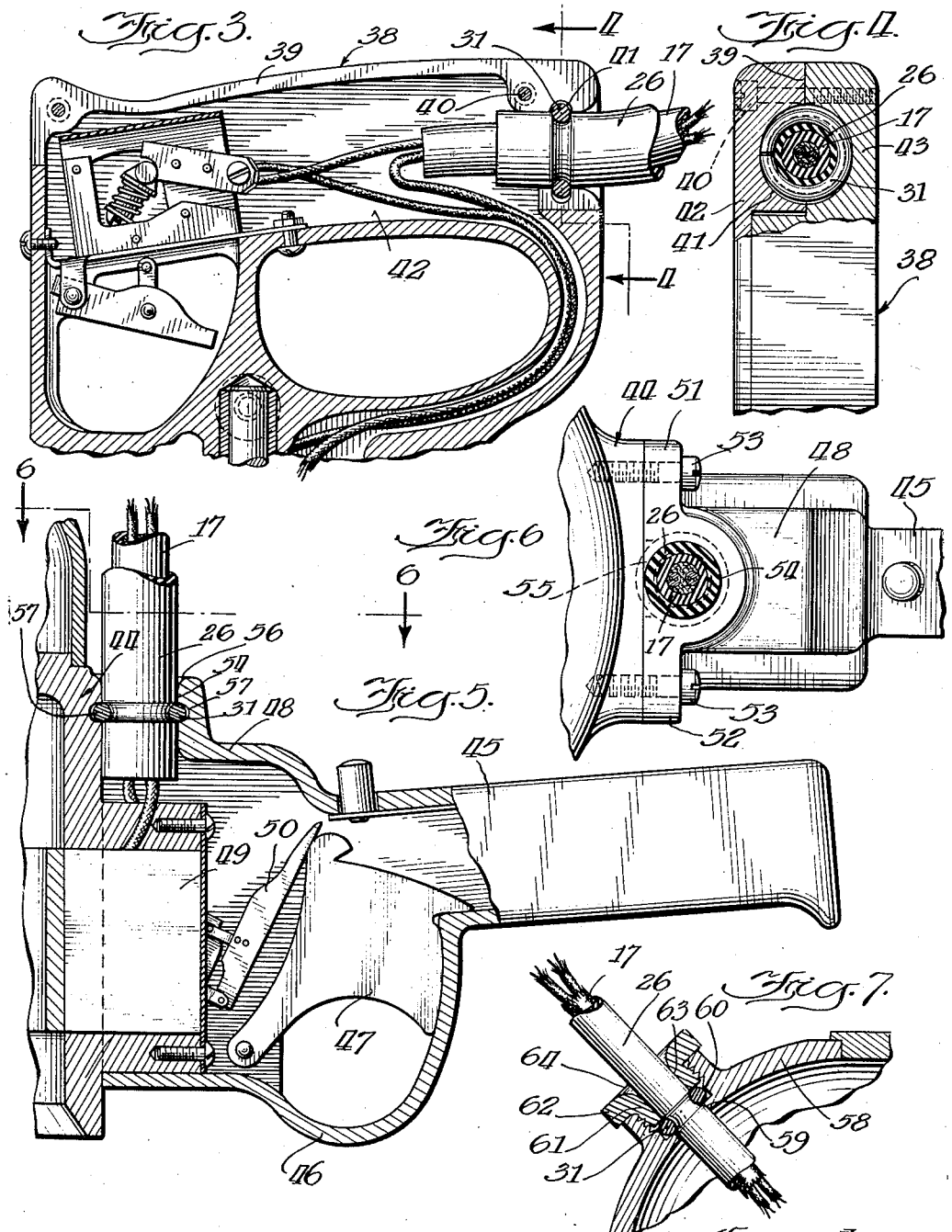

Patented Oct. 16, 1934

1,977,224

UNITED STATES PATENT OFFICE 1,977,224

HANDLE AND CABLE HOUSING FOR ELECTRIC DEVICES

Frans O. Albertson, Sioux City, Iowa, assignor to Albertson & Company, Inc., Sioux City, Iowa, a corporation of Iowa Application November 30, 1932, Serial No. 645,000

3 Claims. (Cl. 173—322)

The present invention relates to a handle and cable housing for electric devices, and is particularly concerned with anchoring devices for securing electric cable to the electric device, the cable being arranged in the handle of an electric motor driven tool. However, the anchoring device may be employed for various different electrical devices, and in some embodiments need not necessarily be arranged in a handle. I do not wish to limit myself in the use of my anchoring device, except as set forth in the appended claims.

One of the objects of the invention is the provision of an improved anchoring device for the cable conductors adapted to be used with electric polishers, drill motors, and various other electrical devices.

Another object of the invention is the provision of an improved handle arrangement for electric polishers of the class described, by means of which the polisher may be more conveniently manipulated without tiring the wrists of the operator in the polishing of vehicle bodies and other objects.

Another object of the invention is the provision of an improved mode of attachment for cables to electrical devices, by means of which the cable is securely anchored to the electrical device so that no strain will be placed upon the electrical connectors to which the cable is attached, and the provision of an improved anchoring device by means of which strain on the cable itself is reduced at the point of ingress of the cable into the electrical device.

Another object of the invention is the provision of an improved cable housing adapted to be used where an electrical conductor cable enters an electrical device and arranged to diminish the wear on the cable and to prevent sharp bends in the cable at the point of its egress from the electrical device.

Another object of the invention is the provision of an improved cable housing and anchoring device which is adapted to relieve the tensile strain on the cable at the point of its egress from the electrical device, as well as avoid the sharp bends in the cable at that point, thereby protecting the cable against the two contributing factors which together tend to make the cable wear out at or near the point where it is secured to the electrical device.

Another object of the invention is the provision of a plurality of modified forms of the anchoring device by means of which the anchoring device may be adapted to electric polishers, drill motors, electric casings, and various electrical devices.

Other objects and advantages of the invention will be apparent from the following description and from the accompanying drawings, in which similar characters of reference indicate similar parts throughout the several views.

Referring to the drawings, of which there are two sheets:

Fig. 1 is a side elevational view of an electric polisher of the type disclosed in my prior application, Serial No. 560,887, filed September 3, 1931 (of which this application is a continuation in part), including a cable housing constructed according to the present invention;

Fig. 2 is a sectional view taken on the plane of the line 2—2 of Fig. 1, with the cable in elevation, showing the details of construction of the handle, cable housing and anchoring device;

Fig. 3 is a sectional view taken through the electric handle of a drill motor, showing a modified form of handle with the same anchoring device and cable housing;

Fig. 4 is a sectional view taken on the plane of the line 4—4 of Fig. 3, looking in the direction of the arrows;

Fig. 5 is a vertical elevational view of another type of drill motor or driving motor handle equipped with a switching device, cable housing, and anchoring device constructed according to the present invention;

Fig. 6 is a top plan view with the cable in section, taken on the plane of the line 6—6 of Fig. 5; and Fig. 7 is a sectional view, taken on a plane passing through the axis of the cable, with the cable in elevation, and showing another modification in which the cable is anchored directly to the housing or casing of an electrical device of any convenient type.

Referring to Fig. 1, the electric polisher in question, which includes one form of the handle and cable housing, preferably includes an electric motor 10 of the series wound type, a gear housing 11, a drive shaft 12, and a lamb's wool covering, or bonnet 13 carried by a supporting pad mounted on the shaft 12. The motor 10 preferably supports at the end opposite from the gear housing 11 a switch casing 14 and tubular handle 15 provided with a ball shaped formation 16.

The cable 17 preferably comprises a plurality of insulated conductors 18, 19 and 20, all of which are covered by a flexible and resilient water-proof rubber sheath, 21, which extends into the tubular handle or housing 15 to a point adjacent the switch mechanism 22. One of the conductors 18, 19 and 20 serves as a ground lead to ground the frame of the motor to the midpoint of the transformer or the ground, and the other two conductors are utilized for a connection to the source of power to supply the motor with suitable current, such as 110 volt A. C. or D. C. current supply.

The tubular handle 15 is preferably provided with threads 23 at its outer end adapted to engage the complementary threads of a metallic sleeve 24 secured in the ball shaped formation 16. The ball shaped formation 16 may be made of metal or any suitable material, but is preferably molded out of a phenolic condensation compound having insulating properties. The handle 15 is preferably provided with a circular bore 25 which is substantially the same size as the outside diameter of a tubular rubber hose 26.

The insulating ball 16 is also provided with a registering bore 27 adapted to pass the hose 26, and the bore 27 is provided with an outer tapered or bell shaped formation 28 where the hose 26 emerges from the ball.

The curved surfaces 28 assist in preventing a sharp bend in the cable 21 at the point where the cable and hose emerge from the handle and thereby reduce the wear on the cable.

The sleeve 24 may be provided with an inwardly extending flange 29, and the ball is provided with an inwardly extending radial shoulder 30, either one of which may engage a metallic ring or clamping member 31 carried by the hose 26 and engaging the end of the tubular handle 15. The clamping member 31 comprises a hard spring brass wire or a steel wire of suitable length, which is clamped about the hose 26 and which by virtue of its stiffness holds the hose 26 in clamped position against the rubber cable 17.

The clamping metal ring 31 compresses the hose about the cable and serves to secure the hose to the cable at that point. The hose protects the cable from the bad effects of the clamping action of the metallic ring on the cable. The hose serves to increase the effective area of pressure of the clamping ring 31 on the cable 17 and prevents any possibility of short circuiting the conductors by the clamping ring 31 cutting through the cable. The clamping ring 31 abuts against the end of the handle 15 and is secured there by the annular flange 30 in the ball 16 or by the engagement of the flange 29 with the metal ring 31. The ball 16 thus clamps the wire ring 31 against the end of the handle by virtue of the threads 23, thereby anchoring the hose 26 in the handle as well as the cable 17.

The polishing devices with which this anchoring device and cable housing are used are naturally subject to a great deal of movement, and the movement of the polisher subjects the cable 17 to repeated bending at the point of its egress from the tubular handle 15.

The rubber hose 26 prevents abrupt bends in the cable at the end of the handle, and preferably extends along the cable 17 outside the handle for a sufficient distance from the handle to insure the protection of the cable adjacent the handle and to form a relatively easy bend in the cable at the end of the handle. For instance, the hose 26 may be eight inches or a foot in length. Sufficient slack is provided for the conductors 18, 19 and 20 inside the handle 15 and switch housing 14 so that there is no strain whatever placed upon the connection between the conductors and the switch, and there is no tendency for the conductors to be pulled loose from the switch by means of the cable. Although the electric polisher is not intended to be lifted or carried by means of its cable, it is found that many users are apt to lift the polisher by means of the cable on certain occasions, or the cable may be subjected to considerable strain when attempting to reach certain parts of a vehicle or other device to be polished, particularly when the cable becomes caught on some part of the work. The operator who is manipulating the polishing device gives his attention primarily to the polishing and expects the cable to follow the polisher so that he does not always see that the cable is given sufficient slack.

In order to relieve the strain on the cable 17 adjacent the handle 15 and to transfer the strain to the hose 26, which is better adapted to withstand it, the hose 26 is preferably provided with another thick metal clamping ring 32 arranged near the opposite end of the hose 26, forcing the hose into clamping engagement with the rubber 21 of the cable 17. This protects the end of the hose against the ingress of foreign materials, and enables the hose 26 to take any tensile strain which is placed upon that portion of the cable 17 immediately adjacent the handle 15.

The cable 17 is thus relieved from heavy tensile strain immediately adjacent the handle, and it is also relieved from relatively abrupt bends, and therefore both the factors which contribute toward the repeated sharp bending and straightening of the electric wires have been eliminated. In order to finish the end of the hose 26 in such manner that it cannot be torn when the hose is scrapped over parts of the machine or subjected to rough usage, the end 33 of the resilient flexible rubber hose 26 is preferably folded back over the thick metal clamping ring 32, forming a roll 34 outside of the metal ring 32. The end 33 of hose 26 contracts above the metal ring 32 into engagement with the outside of the hose 26 and holds that part of the hose in the position shown in Fig. 2.

This also provides a finished appearance for the end of the protecting hose, as shown in Fig. 1, without necessity for any further finishing operations or without the necessity for any finishing rings.

The inside of the hose at the point 35, where the cable 17 emerges from the hose, is also naturally provided with a bell shaped surface, which prevents the sharp bend in the cable at the point 35. Of course, the hose naturally bends with the cable also, so that there is no sharp bend in the cable at the place where the cable emerged from the hose.

The ball 16 is located to be engaged by the palm of the hand when the thumb of the operator is immediately adjacent the switch operating member 36. This ball permits the operator to pivot the electric polisher in the hollow of one hand while using the other hand upon the handle 37, which projects laterally from the gear housing.

This greatly reduces the strain on the wrist of the operator, since it is unnecessary to bend the wrist of the hand which is holding the ball 16, but the ball is permitted to slide in the hollow of the hand. As it is necessary to apply a considerable amount of force in certain polishing operations, this handle arrangement is very advantageous in reducing the fatigue of the operator and increasing the ease of manipulation of the polisher.

The handle structure 15, 16 has marked advantages, not only from the point of view of anchoring the cable and protecting the cable by means of the housing, but also from the point of view of facilitating the manipulation of a polisher or other electric tool with greater ease.

Referring to Fig. 3, this is a modification comprising a handle and cable housing for a drill type motor. The handle 38 of this type is similar in shape to the handle of a spade or shovel and is formed by two cast metal members joined together along the line 39 by a plurality of screw bolts 40 passing through one member and threaded into the other. The complementary parts of the handle 38 are formed with semi-circular grooves 41 adapted to receive the thick metal wire ring 31 which clamps the hose 26 against the cable 17 exactly as described in the previous embodiments.

The other details of the hose 26 and cable may be exactly as previously described. Two complementary parts 42, 43 of the handle are clamped together by screw bolts 40, with the metal ring 31 in the grooves 41, the cable 17 and hose 26 being securely anchored in the handle 38.

Referring to Fig. 5, this is another modification in which a motor housing 44 is provided with a laterally projecting handle 45 of substantially rectangular shape. The handle 45 is provided with a finger opening 46, permitting actuation of the switch member 47, and is formed with an enlargement 48 for housing a switch 49, preferably of the snap type adapted to move to open position when pressure is removed from the switch lever 50.

In this embodiment the cable 17 and hose 26 are not located in the end of the handle, but pass directly into the switch housing 48. The switch housing is formed with a pair of attaching flanges 51, 52 for receiving the screw bolts 53, which are threaded into the motor housing 44. The switch housing 48 is formed with a circular bore 54 extending outward from the inside of the housing and having one open side 55.

The bore 54 is formed with a bell shaped opening 56 at its outer end and with a semi-circular groove 57 for receiving the thick clamping wire 31. When the hose 26 and cable 17 are disposed in bore 54 with the wire 31 in groove 57 and the attaching flanges 51 are secured to motor housing 44, the walls of groove 57 secure the metal ring 31 in the switch housing. The groove 57 may also extend around into the side of the switch housing adjacent the bore 54, as shown in Fig. 5.

Referring to Fig. 7, this is another modification comprising an electrical device, such as a motor, in which the cable 17 and hose 26 pass directly into the housing or casing 58 of the electrical device. This housing is provided with a bore 59 for egress of the cable and hose, and with a counter-bore 60 for receiving the metal clamping ring 31. Counter-bore 60 is threaded to receive a threaded plug 61 having a non-circular head 62 and having a bore 63 for passing the hose 26.

Bore 63 is preferably provided with a bell shaped opening 64 at its outer end to prevent a sharp bend in the hose and cable at that point.

It will thus be observed that the present anchoring device may be used for anchoring the cable in the end of the handle, at the side of the handle in the switch housing, or in the wall of the casing of an electrical device.

In any of these modifications, the anchoring device and cable housing prevent a sharp bend in the cable, diminish the tension on the cable adjacent the point of its anchorage, and transmit the tension from the cable to the protecting hose adjacent the point of its egress from the metallic housing.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a casing and cable housing for electrical devices, the combination of an electrical device, with an electrical supply cable, an auxiliary tubular flexible member covering said cable and preventing a short bend at the point of egress from the casing, means for anchoring said cable and flexible member to said casing, and clamping means at the outer end of said flexible member comprising a stiff metal ring, clamping and embedded in said flexible member, the outer end of said tubular flexible member being turned back over and outside said clamping ring and forming a rolled finishing edge for said tubular member.

2. In a cable anchoring device for electrically operated devices, the combination of an electrical device with an electric supply cable including a plurality of conductors, an auxiliary flexible tubular member covering said cable and adapted to prevent a sharp bend in said cable at the point of its egress from said device, a metallic clamping member resiliently clamping said tubular member into engagement with said cable at the end of said cable under said device, means for engaging said clamping member and securing it to the device, and a second clamping member carried by said flexible tubular member at its opposite end and resiliently clamping said flexible tubular member into engagement with said cable to secure said cable to said tubular member and transfer the tensile strain from said cable to said tubular member throughout the length of said tubular member, said clamping members comprising stiff wire rings bent into clamping engagement with said tubular member and said wire members being embedded in said tubular member.

3. In a cable anchoring device for electrically operated devices, the combination of an electrical device with an electric supply cable including a plurality of conductors, an auxiliary flexible tubular member covering said cable and adapted to prevent a sharp bend in said cable at the point of its egress from said device, a metallic clamping member resiliently clamping said tubular member into engagement with said cable at the end of said cable under said device, means for engaging said clamping member and securing it to the device, and a second clamping member carried by said flexible tubular member at its opposite end and resiliently clamping said flexible tubular member into engagement with said cable to secure said cable to said tubular member and transfer the tensile strain from said cable to said tubular member throughout the length of said tubular member, said clamping members comprising stiff wire rings bent into clamping engagement with said tubular member and said wire members being embedded in said tubular member, and a protecting and finishing bead formed at the outer end of said tubular member by the end of said tubular member turned back over said clamping wire.

FRANS O. ALBERTSON.